Nov. 1, 1927. 1,647,396
A. G. DECKER
ROTARY TOOL WITH KEY POCKET
Filed June 25, 1925 3 Sheets-Sheet 2
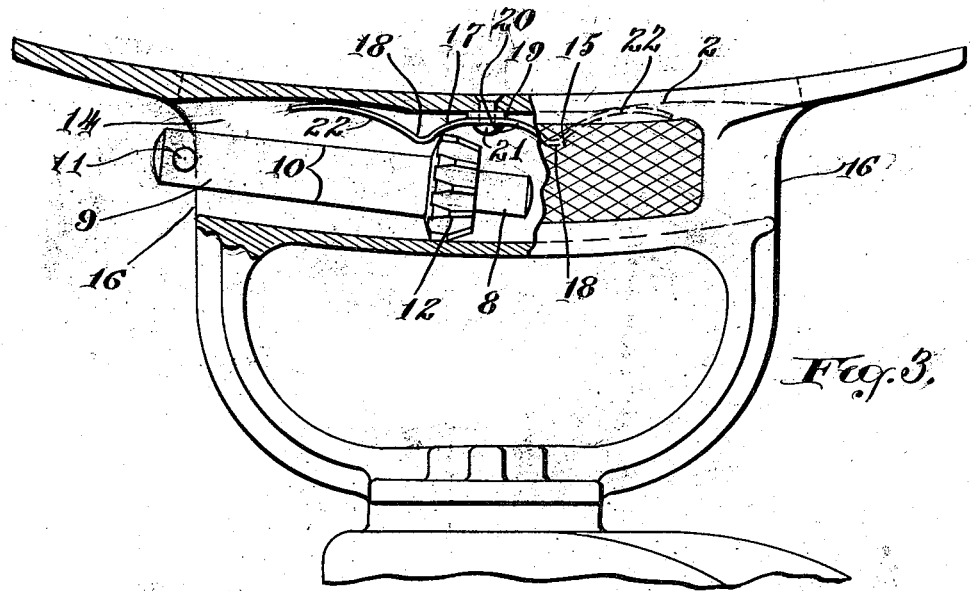
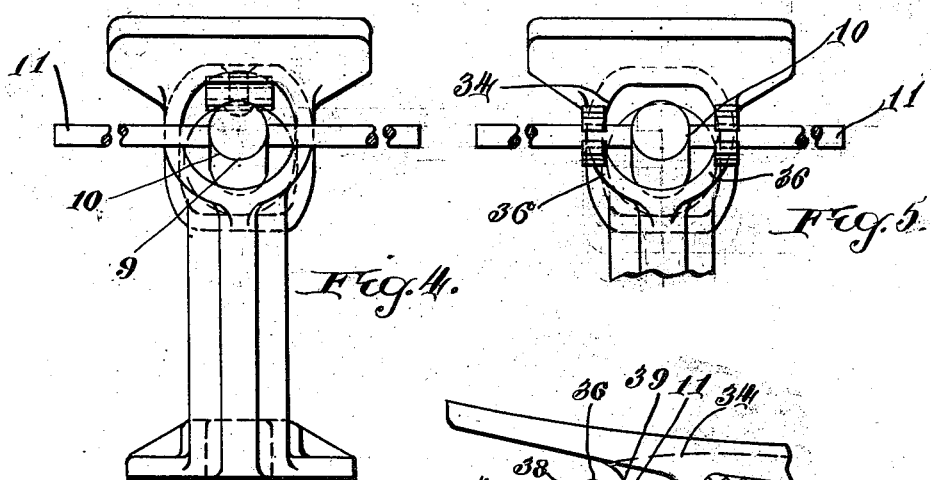
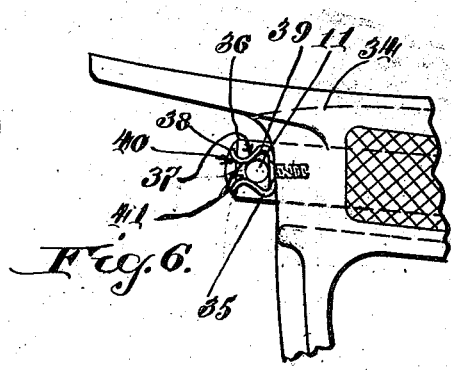

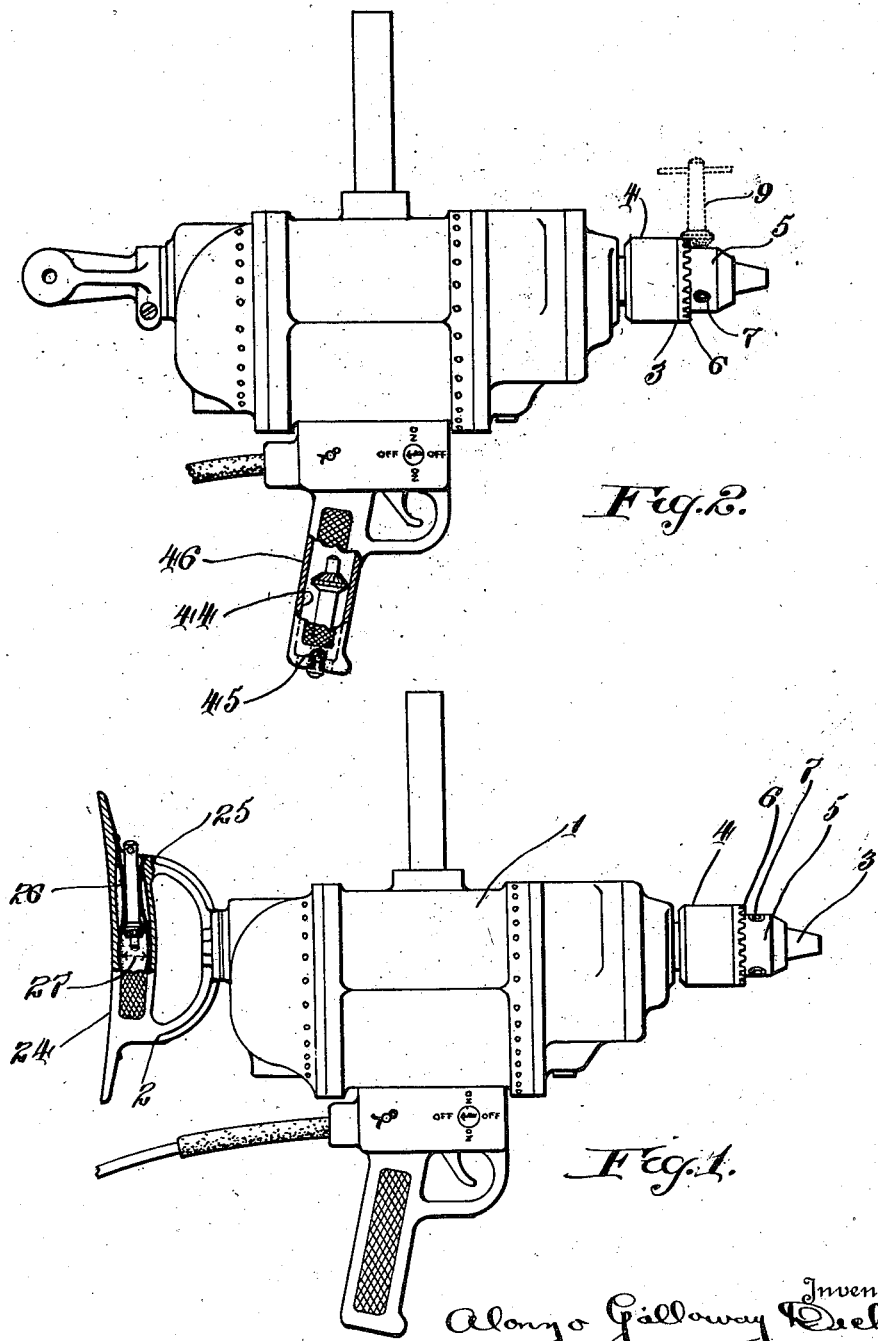

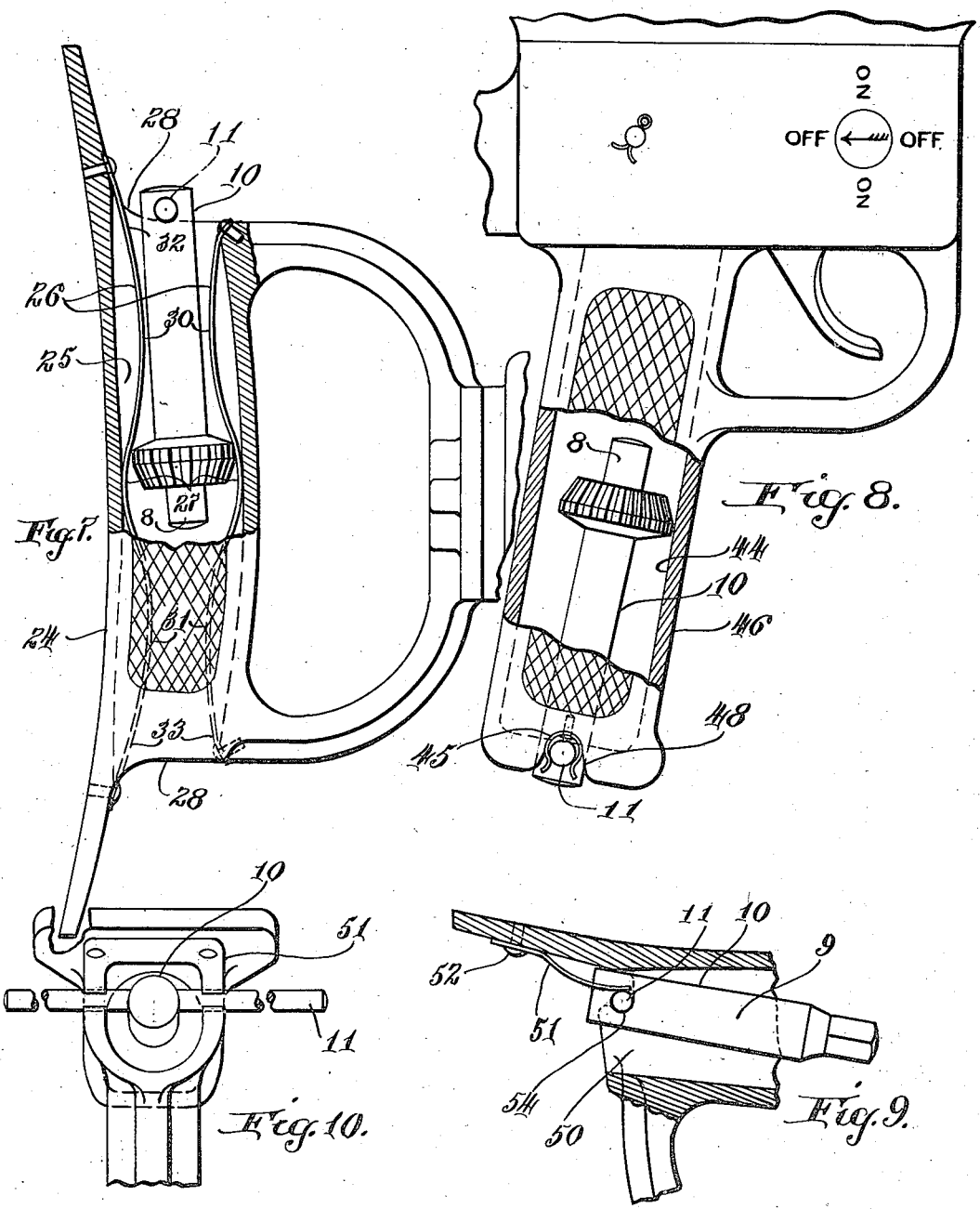

Patented Nov. 1, 1927.

1,647,396

UNITED STATES PATENT OFFICE.

ALONZO GALLOWAY DECKER, OF BALTIMORE COUNTY, MARYLAND, ASSIGNOR TO THE BLACK & DECKER MANUFACTURING COMPANY, OF TOWSON, MARYLAND, A CORPORATION OF MARYLAND.

ROTARY TOOL WITH KEY POCKET.

Application filed June 25, 1925. Serial No. 39,428.

To clamp and release the bit, i. e., to operate the chuck in the various portable power-driven rotary tools as drills, screwdrivers, wrenches and the like, the clamping element of the chuck being a sleeve with an internally tapered threaded portion and a set of correspondingly threaded jaws mounted in converging holes in the chuck body, it is necessary to rotate the sleeve and jaws relatively to the chuck body which is secured to the spindle, and in order to produce the desired clamping effect, to apply a considerable degree of torque in producing this relative rotation of the parts. As the shaft and motor in most power-driven tools are completely encased and the projecting rotary portions, principally the chuck, are circular and of comparatively small diameter, it is practically impossible to so grasp them by hand as to successfully clamp and release the bit.

To obviate the necessity for operating the chuck in this way, the chuck sleeve is most commonly provided with a row of bevel teeth concentric with the axis and radiating therefrom, and the parts are operated by means of a key having a bevel pinion secured to the other end with a centering pin beyond the pinion, which pin takes a bearing in a hole or holes in the chuck body, the teeth of the bevel pinion engaging the teeth on the chuck sleeve, so that by turning the key, the parts, i. e., the base and the clamping member may be rotated, one relatively to the other conveniently and with comparatively little effort, the pinion being small relatively to the leverage at the cross-bar. With different types of chucks, keys of different types are used.

The chuck may be tightened on the bit in this way quickly and with comparatively little effort but it is very difficult to keep track of the keys, which are small compared to the tool and cannot be conveniently attached by means of a cord or chain in such a way as to be available for use, as the tools are subject to rough and constant handling in use, and when so fastened, the keys get in the way and soon become detached by breaking of the cord and are lost, disabling the tool.

The present invention relates to the provision of means for so placing and carrying the key that it is always available and cannot be lost or detached when once stowed, the arrangement being such that the key is automatically locked against accidental displacement. This means is in the form shown, a conveniently accessible pocket for the key with means for holding the key in the pocket, whereby it is automatically gripped when inserted, the parts being so arranged that the key is entirely out of the way at all times and instantaneously accessible, a pull on the key serving to release it. The key pocket is preferably located in the handle which may be of various types, and the key is held therein by means of a spring or similar grip which engages the key on its insertion, the key being given a slight excess thrust for this purpose and released on application of a pull slightly in excess of what would otherwise be necessary.

In the accompanying drawing I have illustrated an electric drill having a chuck opened and closed by means of a key, the drill being provided with a pocket in the handle in accordance with the invention, the same being shown in several slightly modified forms.

In the drawings—

Figure 1 is an elevation of an electric drill having a chuck operated by a key, the drill being provided with a spade handle having a pocket for the key, the pocket having means for holding the key against displacement, the latter being shown in section.

Figure 2 is an elevation of an electric drill having a pistol grip, the tool having a chuck operated by a key and a pocket for the key in the pistol grip.

Figure 3 is an elevation of a handle for a rotary power-driven tool as a drill, grinder or screw-driver, the same being of the type known as a spade handle and being provided with a pocket for the key with a clip for holding the key in the pocket, the pocket being sectioned.

Figure 4 is a side view looking from the left in Figure 3 at one opening to the pocket. This view shows the key protruding from the socket.

Figure 5 is a fragmentary view looking at the entrance to the pocket as in Figure 4, but showing a modified form of clip, the handle in both instances being the spade type of handle; and Figure 6 is a fragmentary view of the spade type of handle similar to Figure 3 but with portions removed and having the modified form of clip for holding the key in the pocket as in Figure 5.

Figure 7 is a view corresponding to Figure 3 showing a spade handle having a clip with a plurality of springs forming the clip, so that it is more flexible and adapted to hold keys of different sizes, a single handle being kept in stock by the dealers and applied to different sizes of tools which have chucks of different sizes and require keys of different sizes, any of which may be carried and held in the pocket shown.

Figure 8 is a detail view showing fragmentarily a pistol grip provided with a pocket and clip in accordance with the invention, the clip being of the type shown in Figures 5 and 6.

Figure 9 is a view corresponding to Figure 3 but showing only a fragment at the end of a spade handle, the portion shown being in section to show the pocket and clip, which are of another form; and Figure 10 is a side view from the left in Figure 9 showing the pocket opening and cross-bar of the key and the end of the key shaft.

Referring to the drawings by numerals, each of which is used to indicate the same or similar parts in the different figures, a rotary power-driven portable tool in the form of a drill, screw-driver or wrench is shown in Figure 1. The tool indicated by reference character 1, is provided with a spade handle 2 and a chuck 3 having a sleeve 4 and body 5, the sleeve having on its edge a ring of bevel teeth 6 and the body member of the chuck having one or more radial holes or sockets 7 to be engaged by the pin 8 on the end of the key 9 which, see Fig. 3, is in the form of a shaft 10 having a cross-bar 11, the shaft being provided at the end opposite the cross-bar with a bevel pinion 12 which is positioned and centered by the pin 8 which is aligned with the shaft and projects from the small end of the pinion.

In accordance with the established practice, the chuck is operated, i. e., opened and closed by placing the key 9 as illustrated in dotted lines in Figure 2, with the pin 8 in a hole 7, the bevel pinion 12 meshing with the bevel teeth 6 on the lower edge of the chuck sleeve 4, rotation of the key in this position serving to rotate the clamping member of the chuck relatively to the base to open and close the chuck jaws.

As already pointed out, it is not convenient to attach the key by means of a cord or chain or an external clip, as the tools are subject to rough usage and the keys thus secured are soon detached and mislaid, when the tool becomes practically inoperative, nor are covered pockets desirable as the cover is difficult to attach and detach, causing loss of time, and is, on account of the difficulty in attaching and detaching, soon lost or abandoned, the pocket remaining unused.

In view of these various difficulties, the applicant has devised a pocket in which the key may be inserted but from which it projects, the pocket being uncovered and provided with a spring clip to engage and hold the key, the engagement being automatic. In Fig. 3 pocket 14 in the grip 15 of the spade handle may extend the entire length of the grip, being open at 16 at both ends and provided intermediately with a spring clip 17 consisting of a plate spring bent to form two peaks 18 spaced on each side of the centre portion 19 which is concave toward the centre of the pocket, which portion 19 forms a depression 20 to receive the edge of the key portion 12. The plate spring 17 is placed longitudinally of the pocket and secured in any convenient manner as by means of a rivet 21, which as shown is passed through the centre of the spring and through the top side wall of the pocket. Each outer end of the plate spring 15 beyond the peaks 18 is curved or inclined away from the adjacent peak at 22 forming an incline which serves to lead the end portion of the key when it is thrust into the pocket over the peak into the depression or socket 20, the tension of the spring which is comparatively slight being overcome by the thrust with which the key is inserted, flattening the peak and permitting the key to enter the pocket. The resiliency of the spring likewise serves to hold the key in the pocket. Preferably the spacing of the depression 19 from one end of the pocket is such as to bring the cross pin or bar 11 in close contact with the outer surface of the grip surrounding the pocket opening, so that the key is held against rattling.

In accordance with the practice prevailing in the applicant's factory and sales organization, a single spade handle fits tools of several different sizes so that ordinarily each dealer need keep in stock for replacement purposes but a single handle, but the different sizes of drills having different sized chucks require different sized keys. For the larger drills the keys are made heavier and with larger bevel gears or other engaging parts, and in order to accommodate the various keys and to maintain the practice which requires but a single handle to be kept in stock, the pockets may be made so as to accommodate keys of several different sizes. Such a handle is shown in enlarged detail in Figures 7 and 1. This handle 24 has a pocket 25 which may extend the full length of the grip and be open at both ends at 28.

As shown the pocket contains two flexible springs 26 one on each side bent outwardly at the centre to form a central chamber or space 27 between the springs with relatively constricted passages 30, 31 at each side of the chamber in the directions of the openings of the pocket. The passage between the springs is of the full width of the pocket openings at the ends, the springs at these points 32 and 33 diverging from the restricted portions. The chamber or space 27 between the centres of the springs tapers toward the restricted portions 30, 31 which with the flexibility of the springs provides for the engagement of keys of different sizes particularly having mitre gears of different sizes. The length of the keys varies more or less according to the diameter of the bevel pinions which permits the pinions of the larger keys to rest nearer the centre of the chamber in the wider part of the same, any tendency to play being duly taken up and any increase of size being accommodated by the flexibility of the springs in other types of keys other elements control.

In the preferred position of the key, the cross-bar 11 rests on the outside surface of the handle at the edge of the pocket opening.

Figure 4 is a view of the handle looking at the pocket opening with the end of the key shaft 10 and the cross-bar 11 projecting therefrom, the latter being held in contact with the edges of the opening.

In Figures 5 and 6 I have shown a spade handle having a pocket 34 with a slightly different form of spring clip 35, the same being in the form of a U-shaped spring, two of said springs being preferably used in each instance. The cross-arm of the U is secured to the handle on the edge 36 of the opening. As shown one clip is placed on each side of the opening. The legs "37" of the U project outward at the end of the handle and are bent together intermediately and curved outward at the ends 38. They form adjacent the cross-bar and immediately adjacent the edges of the pocket opening a chamber or space 39 between the legs of the U-shaped spring to hold the cross-bar 11 of the key, and at the outer ends a tapered funnel-like entrance 40 which facilitates the placing and admission of the cross-bar to the grip chamber 39. The minimum dimension of the passage at 41 is less than the diameter of the cross-bar, so that the chuck key being thrust into the pocket and being advanced until the cross-bar approaches the edges of the pocket opening, the cross-bar enters between the ends of the U-shaped spring and is passed through the narrower portion of the opening overcoming the resistance of the spring and spreading the legs of the U, which as the cross-bar enters the chamber or enlarged space adjacent the edges of the walls of the pocket, spring together, gripping and holding the cross-bar between the arms of the U-shaped spring and preventing accidental displacement of the key from the pocket.

In Figures 2 and 8 I have illustrated a portable electric drill or other portable rotary power-driven tool having a chuck which is opened by means of a mitre pinion key. This tool has a pistol grip 46 in which is formed a pocket 44 for the key. This pocket is provided with a spring clip 45 of the U-shaped variety 35 described in connection with Figures 5 and 6, the same being secured to the edges of the pocket opening to hold the cross-bar 11 of the key 9. In this instance the edges of the pocket are notched at 48 to admit the cross-bar and clip below the level of the edge of the pocket opening.

Figures 9 and 10 show a spade handle as in Figures 1, 3 and 7 having a pocket 50 in the grip similarly placed to those in Figures 1, 3 and 7. In this pocket I have shown a key having a square end to fit in a suitable pocket in the screw which operates the chuck. In this instance the clip is in the form of a spring 51 fastened to the projecting end of the handle at 52 and extending just inside the pocket 50, the walls of the pocket being notched at 54 to admit the cross-bar 11. The spring 51 holds the cross-bar 11 in the notch 54 which is upwardly disposed, so that the bar 11 is sprung in to the enclosure of the hook and held against accidental displacement.

I have thus described specifically and in detail a key pocket for use in connection with a portable power-driven rotary tool, the manner of placing the same in the tool, the function thereof, and several forms of spring clip for holding the key in the pocket. The description is specific and in detail in order that the invention and the manner of using the same may be fully understood; however, the specific terms herein are used descriptively rather than in a limiting sense, the scope of the invention being defined in the claims.

What I claim and desire to secure by Letters Patent is:

1. A casing for a rotary power-driven portable tool having a chuck with gear teeth and a key with a toothed pinion to operate the same, having a pocket adapted to hold the key and a spring forming an enclosure to receive a portion of the key and a constricted opening to said enclosure through which the said portion of the key is forced into the enclosure as the key is inserted into the pocket, causing the spring to grip the key and hold it against displacement.

2. A handle for a power-driven portable rotary tool having a chuck and a key to operate the chuck, the handle having a pocket therein to receive the key, the pocket having a spring forming an enclosure to receive a portion of the tool and a constricted opening to said enclosure through which a portion of the key is passed, as the key is introduced into the pocket, automatically gripping the key and holding it in the pocket.

3. A handle for a portable power-driven rotary tool having a chuck and a key with a cross-bar to operate the chuck, the handle having a pocket therein to receive the key, the edges of the pocket being notched to receive the cross-bar and the notch being provided with means for holding the cross-bar in the notch.

Signed by me at Baltimore, Maryland, this 11th day of June, 1925.

ALONZO GALLOWAY DECKER.